FIG./.

March 17, 1970   G. BOES ET AL   3,500,754
CENTRIFUGAL PUMP UNITS
Filed Jan. 25, 1968   3 Sheets-Sheet 2

INVENTOR
GUNTHER BOES
WILLI PLUMEYER
CHRISTIAN SCHMIDT
By
ATTORNEYS

United States Patent Office 3,500,754
Patented Mar. 17, 1970

3,500,754
CENTRIFUGAL PUMP UNITS
Gunther Boes and Willi Plumeyer, Luneburg, and Christian Schmidt, Neetze, Germany, assignors to Loewe Pumpenfabrik GmbH, Luneburg, Germany, a joint-stock company of Germany
Filed Jan. 25, 1968, Ser. No. 700,421
Int. Cl. F04d *13/02*
U.S. Cl. 103—87                                9 Claims

ABSTRACT OF THE DISCLOSURE

A centrifugal pump unit includes a centrifugal pump coupled by a shaft to an electric motor. The pump housing and the motor casing are connected together and a coupling is provided between the rotor of the electric motor and the pump rotor which is sufficient only to transmit the torsion between the rotors of the electric motor and of the pump.

---

The invention relates to a centrifugal pump unit consisting of a centrifugal pump and an electric motor forming one block, and a shaft stuffing box sealing off the pump housing from outside in the form of a slip-ring seal.

The invention is based on the problem of providing a substantially noiseless pump unit, which is inexpensive to manufacture and simple to assemble and disassemble.

According to the present invention there is provided in a centrifugal pump unit including a centrifugal pump including a shaft, a rotor mounted on the shaft, and a housing, an electric motor having a rotor, and a casing, means connecting the pump housing and the motor casing, and seal means external to the pump housing for preventing the escape of fluid along the pump shaft, the improvement comprising a slender shaft, stressed, in operation, substantially only in torsion which couples the rotor of the motor with the pump rotor.

In a first embodiment in accordance with the invention, the pump rotor is rotatable on a shaft which is rigidly secured to a part of the pump housing, and is carried so that it can slide. At the same time, the end of the shaft facing the electric motor has at least two bends which engage positively for rotation in a casing connected with the electric motor which is provided with complementary grooves.

According to a further characteristic in accordance with the invention, there is provided a ball in the rotor hub, which rests on the one hand against a resilient part and on the other against the shaft secured to the part of the housing, in such a way that even when the rotor is stationary, the shaft is sealed off.

According to another characteristic in accordance with the invention, the pump housing consists of two parts, of which one part contains the volute and the other part the suction chamber.

According to a further embodiment of the pump unit in accordance with the invention, with a rotor of the electric motor in the form of a hollow cylinder, the shaft is passed through the rotor in the form of a hollow cylinder and is detachably secured to the latter. At the same time, the shaft is only detachable in the direction of the electric motor.

A plug coupling may be provided on the shaft, which forms a detachable connection with the rotor. This plug coupling takes the form of a tongued and grooved joint.

Between the electric motor and the pump sound-absorbing and heat-insulating intermediate layers of lagging may be provided.

The assembly and disassembly of the sliding slip-ring packing is extremely simple and time-saving. For assembling of the slip-ring packing, it suffices to detach the joint between the hollow cylinder rotor of the electric motor and the slender shaft traversing the latter. Through the axial movement of this shaft in one direction, the plug coupling is slackened, so that if this movement is continued, the shaft can be fully removed both from the pump and from the electric motor as such. By detaching the cover of the pump house, the slip-ring packing then becomes accessible.

The acoustic lagging of the motor in relation to the pump is also provided. It is well known that an electric motor causes, through the mechanism, for example, bearing noises and so-called magnetisation noises, which if a rigid connection is provided between the motor and the pump are transmitted to the latter and are propagated through any duct connected with the pump. The latter can be amplified if the natural oscillating frequency of the pipe line approximately corresponds with the excitation frequency. The slender shaft transmitting the motor torque to the pump is so resilient that, in particular having regard to the free length between its fixed ends, renders it possible to avoid the joint between the motor and the pump which transmits the noise, this being replaced by a joint which absorbs the noise.

For pumps which deliver hot water, the further important advantage is that firstly the intermediate layer consisting for instance of asbestos between the pump and the motor prevents the transmission of heat by conduction and radiation from the pump housing, and secondly, the slender drive shaft with its small cross-section compared with the surface can transmit hardly any heat to the motor, so that even in the case of high outputs, maintenance-free ball bearings can be used instead of plain bearings.

Two embodiments of a centrifugal pump unit according to the invention are illustrated below with reference to the accompanying diagrammatic drawing, in which.

Figure 1:
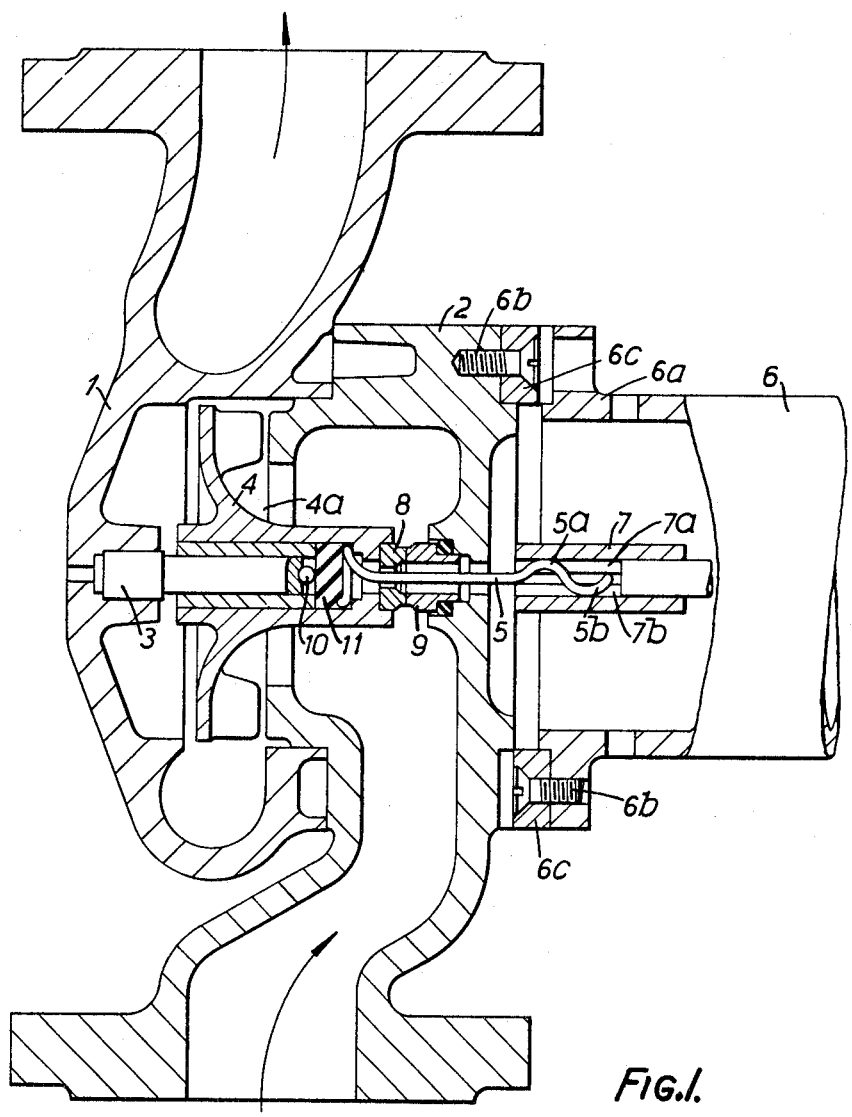
FIG. 1 is a longitudinal section through a first embodiment.

Referring now to the drawings, and in particular to FIG. 1, one part 1 of the pump housing includes the volute.

Another part 2 of the pump housing includes the suction chamber and forms one unit with the suction duct connections. These two parts 1, 2 of the pump housing are detachably secured to one another. These parts can therefore be rotated in relation to one another in such a way that, for example, the axis of the suction duct is at right angles to that of the outlet duct, whereby the possibility is afforded that the centrifugal pump unit can be used as a so-called "bend pump."

A shaft 3 is secured to the part 1 of the housing, which carries the rotor 4 both rotatably and for sliding. The shaft 3 merely serves to take the weight of the rotor 4 and possibly the hydraulic forces directed radially on to the rotor.

On the other hand, the torque is transmitted through a shaft 5 which consists of a very thin steel wire or a steel wire spiral. As this shaft 5 is merely intended for the transmission of the torque, it may have small dimensions, whereby unusually large errors in the alignment of the motor shaft in relation to the resilient pump drive shaft are permissible. The casing 6a of the electric motor 6 is connected to the part 2 of the pump housing by screws 6b, which pass through vibration-absorbing and heat insulating annular members 6c thus substantially reducing the transmission of vibration and heat from the pump casing to the motor housing and vice-versa.

The end of the shaft 5 facing the electric motor 6, which is shown in the drawing, has at least two bends 5a, 5b, which engage in longitudinal grooves 7a, 7b of a casing 7 connected with the motor 6 so as to be rotationally positive. In this way there is provided a very simple resilient and axially movable coupling between the electric motor 6 on the one hand and the pump on the other. The other end of the shaft 5 is connected in any desired manner with the pump rotor 4.

The sealing of the shaft 5 is effected by means of a slip ring packing 8, 9. The part 8 is connected with the rotor 4 and the part 9 with the part of the housing 2. The slip ring packing 8, 9 acts at the same time as an axial bearing. During delivery, the compressive pressure against the slip ring packing 8, 9 is further increased by the hydraulic thrust acting in the direction from the drive side. For this purpose, the suction mouth 4a of the rotor 4 faces the slip ring packing 8, 9.

In the bore of the rotor which acts as the bearing of the rotor 4 a ball 10 is so disposed that it bears on the one hand against resilient element 11 rigidly secured to the rotor 4 and on the other against the shaft 3, so that even when the rotor 4 is stationary, the shaft 5 is sealed, because an adequate force presses together the surfaces of the packing 8, 9 which slide on one another.

Figure 2:
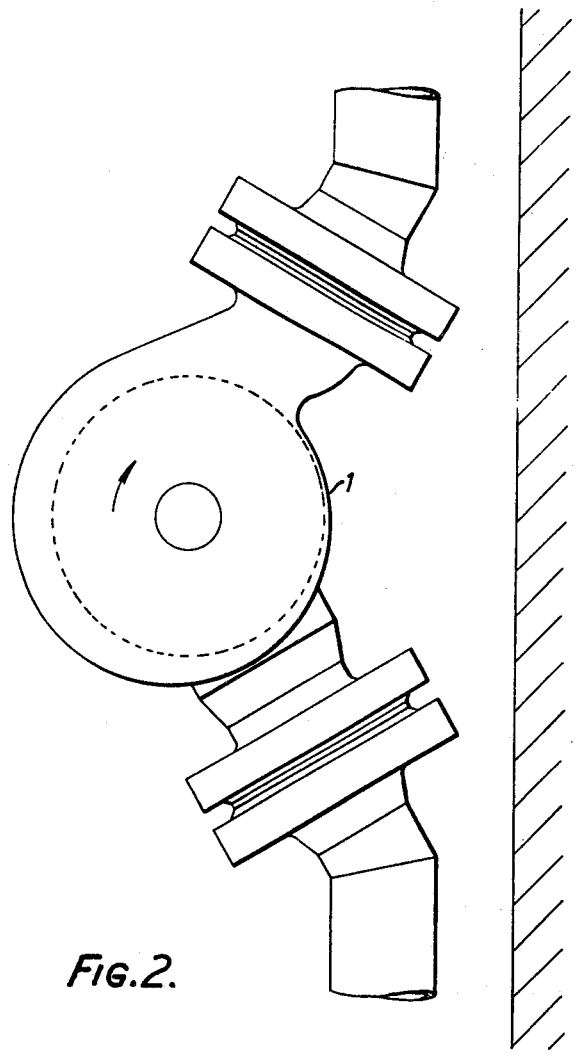
FIG. 2 is a front view of the embodiment of FIG. 1.

FIG. 2 shows diagrammatically the incorporation of the pump with supports in the form of duct connections turned towards one another, in ducting secured directly on a wall.

Figure 3:
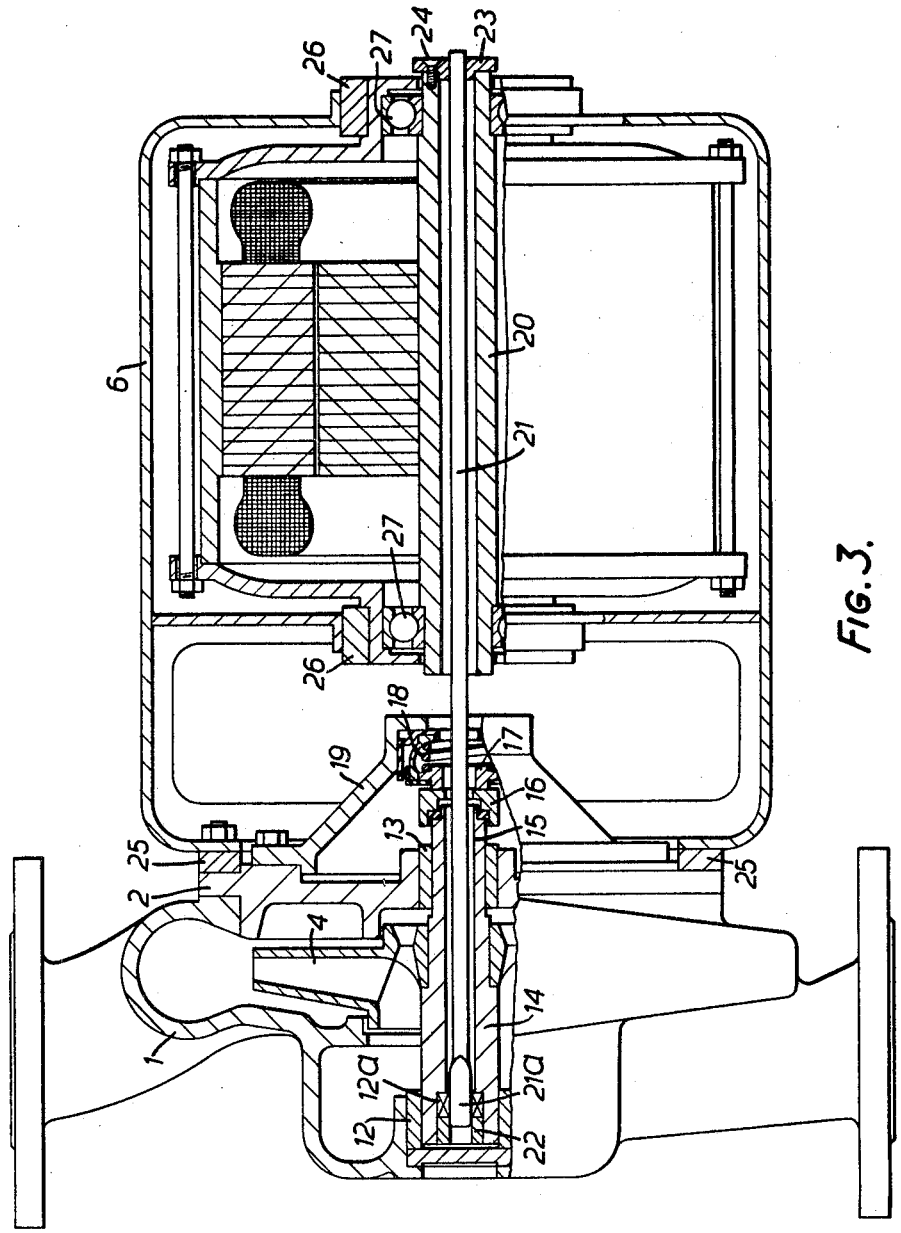
FIG. 3 is a longitudinal section of a second embodiment.

In the embodiment of FIGURE 3, the two parts of the pump housing again have the references 1, 2, while the reference numeral 4 denotes the rotor. The rotor 4 is journaled in bearings 12, 13 lubricated by the liquid to be pumped. These two bearings 12, 13 support the weight of the rotor 4 and the hydraulic forces acting radially on the latter.

There are connected in both directions to the hollow hub of the rotor 4 extensions 14, 15 in the form of hollow cylinders or shafts. The extension 15 is positively connected with the non-rotating ring 16 of a slip ring packing 16, 17, against which is pressed the packing surface of the slip ring packing 16, 17 which is acted on by a compression spring 18. The forces opposing one another on the two packing parts 16, 17 ensure a perfect seal.

The slip ring packing 16, 17 is accommodated by a cover 19, which is detachably secured to the other part of the pump housing, for example by means of bolts. An electric motor 6 is detachably secured to the pump, its rotor being mounted on a hollow cylinder 20.

A slender shaft 21 which is stressed, in operation only torsionally, is coupled at one end through a plug coupling detachable in one direction with the rotor 4. In the embodiment shown in FIG. 3 of the drawing, the plug coupling takes the form of a tongue-and-groove joint. For this purpose, one end of the slender shaft 21 has a flattened part in the form of a spring 21a, which engages positively in a groove 12a of a plug 22. This plug 22 is connected so as to be free for rotation with the extension 14 of the rotor 4. An important feature in accordance with the invention is that by moving the slender shaft 21 in one axial direction the plug connection can be uncoupled.

The other end of the slender shaft 21 is detachably connected with the hollow cylinder 20 of the electric motor.

In the embodiment which is shown in FIG. 3 of the drawing, one end of the slender shaft 21 is welded to a plate 23, which in its turn is detachably connected with the rotor 20, for example by means of screws 24.

The slip ring packing 16, 17 can be disassembled as follows:

After slackening the screws 24 and moving the slender shaft 21 to the right (as shown in the drawing), the latter can be removed both from the pump and from the electric motor 6. Then the cover 19 is removed from the housing 1 by slackening the bolts and removed together with the slip ring packing 16, 17 in a direction transverse to the shaft 21. Moreover, the non-rotary ring 16 is also accessible and can also be easily changed.

The incorporation of a slip ring packing 16, 17 is carried out similarly, but in the reverse order.

Oscillation and heat-absorbing intermediate layers 25 are disposed between the electric motor 6 and the pump.

An annular sound-absorbing, resilient intermediate layer 26, is arranged concentrically to the ball bearing 27.

We claim:

1. In a centrifugal pump unit including a centrifugal pump including
   a shaft,
   a rotor mounted on the shaft, and
   a housing,
   an electric motor having
      a rotor, and
   a casing,
   means connecting the pump housing and the motor casing,
   seal means external to the pump housing for preventing the escape of fluid along the pump shaft,
   the improvement comprising
   a slender shaft, stressed, in operation
      substantially only in torsion which couples the rotor of the motor with the pump rotor through the intermediary of the pump shaft and
   vibration-absorbing and heat-insulating members interposed between the pump housing and motor casing.

2. A centrifugal pump unit according to claim 1 comprising
   a first part, and
   a second part said first part including the pump volute, and
   said second part including the suction chamber of the pump.

3. A centrifugal pump unit according to claim 1, wherein said slender shaft passes through the rotor of the motor and is detachably secured to the latter.

4. A centrifugal pump unit according to claim 3, wherein said slender shaft is only removable by movement towards the electric motor.

5. A centrifugal pump unit according to claim 4, comprising
   a plug coupling, said coupling providing a disengageable joint with the pump rotor.

6. A centrifugal pump unit according to claim 5, wherein the plug coupling comprises
   a tongue and grooved joint.

7. A centrifugal pump unit according to claim 1, comprising
   a hollow cylinder forming part of the electric motor rotor, and
   ball bearings journalling the hollow cylinder.

8. A centrifugal pump unit according to claim 1, wherein the rotor of the electric motor has the form of a hollow cylinder and is releasably coupled to the pump rotor by the said slender shaft, the slender shaft being removable from the unit only by withdrawal from the electric motor end of the unit.

9. A centrifugal pump unit according to claim 1, wherein the rotor of the drive motor is of hollow cylinderical form and wherein the unit further comprises ball bearings journalling the rotor of the drive motor, said vibration-absorbing members having the form of rings of resilient material.

References Cited

UNITED STATES PATENTS

| 2,620,151 | 12/1952 | Peters | 103—87 |
| 2,928,961 | 3/1960 | Morrill. | |
| 3,048,453 | 8/1962 | Scott. | |
| 3,203,353 | 8/1965 | Ruby | 103—87 |

ROBERT M. WALKER, Primary Examiner.

U.S. Cl. X.R.

64—15, 27; 415—119, 177